United States Patent
Rajagopalan et al.

(10) Patent No.: US 10,834,128 B1
(45) Date of Patent: Nov. 10, 2020

(54) SYSTEM AND METHOD FOR IDENTIFYING PHISHING CYBER-ATTACKS THROUGH DEEP MACHINE LEARNING VIA A CONVOLUTIONAL NEURAL NETWORK (CNN) ENGINE

(71) Applicant: FireEye, Inc., Milpitas, CA (US)

(72) Inventors: Balamurugan Rajagopalan, Bangalore (IN); Rahul Mohandas, Bangalore (IN); Santhosh Kumar Ramachandran, Udumalpet (IN); Vamshi Kumar Kurva, Vikarabad (IN)

(73) Assignee: FireEye, Inc., Milpitas, CA (US)

( * ) Notice: Subject to any disclaimer, the term of this patent is extended or adjusted under 35 U.S.C. 154(b) by 104 days.

(21) Appl. No.: 16/003,727

(22) Filed: Jun. 8, 2018

Related U.S. Application Data

(60) Provisional application No. 62/650,847, filed on Mar. 30, 2018.

(51) Int. Cl.
  *H04L 29/06* (2006.01)
  *G06N 3/08* (2006.01)
  *H04L 12/58* (2006.01)
  *H04L 29/08* (2006.01)

(52) U.S. Cl.
  CPC .......... *H04L 63/1483* (2013.01); *G06N 3/08* (2013.01); *H04L 51/18* (2013.01); *H04L 63/145* (2013.01); *H04L 67/02* (2013.01)

(58) Field of Classification Search
  CPC .............. H04L 63/145; H04L 63/1416; H04L 63/1483; H04L 67/02; G06F 21/577; G06N 3/08
  See application file for complete search history.

(56) References Cited

U.S. PATENT DOCUMENTS

| | | | | |
|---|---|---|---|---|
| 7,574,409 | B2 * | 8/2009 | Patinkin | G06Q 10/107 706/12 |
| 8,055,078 | B2 * | 11/2011 | Choi | G06K 9/38 382/209 |
| 8,141,148 | B2 * | 3/2012 | Thomas | G06F 16/951 726/22 |
| 8,468,244 | B2 * | 6/2013 | Redlich | G06Q 10/06 709/225 |

(Continued)

OTHER PUBLICATIONS

Afroz, S. et al. (2011). "PhishZoo: Detecting phishing websites by looking at them," 2011 IEEE Fifth International Conference on Semantic Computing, pp. 368-375.

(Continued)

*Primary Examiner* — Hosuk Song
(74) *Attorney, Agent, or Firm* — Cooley LLP

(57) ABSTRACT

The presently disclosed subject matter includes a system for the detection of phishing cyber-attacks based on an application of deep machine learning techniques including the implementation of a deep convolutional neural network to determine whether a web element associated with a uniform resource locator is part of a phishing cyber-attack. The system produces a notification indicative of the phishing cyber-attack when a positive match between the uniform resource locator and the phishing cyber-attack is determined. The convolutional neural network is retrained at periodic time intervals with new datasets retrieved by an automated dataset collector and thus, improves the detection of zero-days cyber-attacks.

24 Claims, 7 Drawing Sheets

(56) References Cited

U.S. PATENT DOCUMENTS

| | | | |
|---|---|---|---|
| 8,572,184 B1 * | 10/2013 | Cosoi | H04L 51/12 709/206 |
| 9,860,268 B2 * | 1/2018 | Ahmed | H04L 63/1441 |
| 2017/0357814 A1 * | 12/2017 | Mahaffey | H04L 63/145 |

* cited by examiner

SYSTEM AND METHOD FOR IDENTIFYING PHISHING CYBER-ATTACKS THROUGH DEEP MACHINE LEARNING VIA A CONVOLUTIONAL NEURAL NETWORK (CNN) ENGINE

CROSS-REFERENCE TO RELATED APPLICATION

This application claims priority to and the benefit of U.S. Provisional Patent Application No. 62/650,847 filed Mar. 30, 2018 and titled "SYSTEM AND METHOD FOR IDENTIFYING PHISHING CYBER-ATTACKS THROUGH DEEP MACHINE LEARNING VIA A CONVOLUTIONAL NEURAL NETWORK (CNN) ENGINE," which is incorporated herein by reference in its entirety.

TECHNICAL FIELD

The present disclosure relates generally to the detection of cyber-attacks and more specifically to systems for the detection of phishing cyber-attacks through deep machine learning via a convolutional neural network (CNN) engine.

BACKGROUND

Phishing cyber-attacks involve techniques designed to lure users into providing personal information, system credentials, and other sensitive data to unauthorized third-parties. Some of these techniques involve a third party masqueraded as a trustworthy entity through forged emails, voicemails, text messages, websites and other electronic communications directed to users. Some known defense mechanisms based on filters and/or heuristics are limited with respect to zero-day phishing attacks, high false-positive rates, low classification accuracy, among other limitations.

Thus, a need exists for systems that can improve the accuracy and speed at which phishing cyber-attacks are detected to improve the cyber-security.

SUMMARY

At least one embodiment described herein addresses the need for systems to detect zero-day phishing cyber-attacks while overcoming the high false positive rate problem known to be associated with some defense mechanisms against phishing cyber-attacks. In some embodiments, a system to detect phishing cyber-attacks includes at least one computer processor operatively coupled to a computer memory and configured to receive a signal indicative of a uniform resource locator. The system extracts a first web element associated with the uniform resource locator based on an output of a uniform resource locator filter. A web element can be any type of web resource that can be retrieved from the World Wide Web including webpages, emails, images, libraries, script files, and other suitable web resources. The system generates via at least one convolutional neural network a first set of features associated with the first web element. In some instances, the system determines a positive match between the uniform resource locator and a phishing cyber-attack when a similarity score between the first set of features and a third set of features learned by the at least one convolutional neural network reaches a first predetermined threshold. In some instances the system generates via the at least one convolutional neural network a second set of features associated with a second web element extracted from the first web element when the similarity score between the first set of features and the third set of features does not reach the first predetermined threshold and determines the positive match between the uniform resource locator and the phishing cyber-attack when a similarity score between the second set of features and a fourth set of features learned by the at least one convolutional neural network reaches a second predetermined threshold. Thereafter, the system produces a notification indicative of the phishing cyber-attack when the positive match between the uniform resource locator and the phishing cyber-attack is determined.

DETAILED DESCRIPTION

Figure 1:
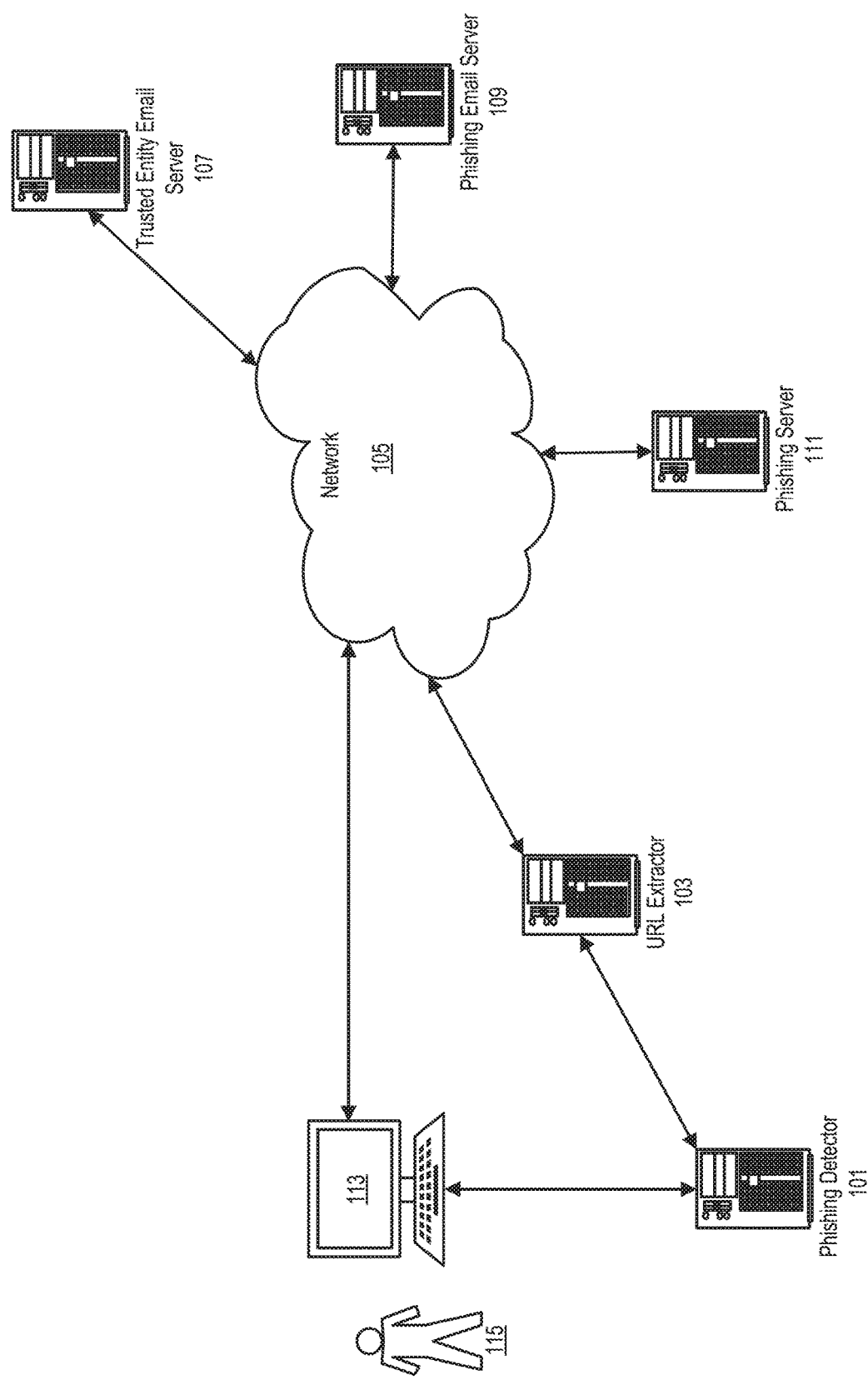
FIG. 1 is a diagram with an example of a phishing cyber-attack detector system coupled to a computer network, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

Phishing is a type of fraud carried out by cyber-attackers to deceivingly persuade individuals to provide access to computer systems, sensitive data and/or information. Some techniques used in phishing attacks include sending spoofed emails, implementing web links that resemble a legitimate domain name (e.g., the domain name of an entity trusted by the targeted individuals), such that targeted individuals effectively click on the web link that redirects to a phishing website. Phishing websites are implemented to have Uniform Resource Locators (URLs) that specify locations of web elements on a computer network (e.g., World Wide Web), the web elements can include graphic design and look that visually resemble a legitimate site.

Phishing websites can have a short life spans (e.g., ten days or less), before they are identified as malicious by cybersecurity systems and/or personnel. Cyber-attackers often repeatedly republish phishing websites using different domain names, different host servers, and/or applying other changes to elements of phishing cyber-attack campaigns to circumvent cybersecurity and prolong an attack life span.

Some known defense mechanisms against phishing cyber-attacks include Domain Name System-based Blackhole List (DNSBL) or other suitable type of blacklists that store lists of locations or Internet Protocol (IP) addresses known to be used for phishing cyber-attacks. Email servers can use DNSBL to detect when an email message has been sent from an IP address known to be associated with phishing cyber-attacks. The use of DNSBL however, is limited because such blacklists tend to include a large number of records and are updated sporadically. Thus, DNSBL-based solutions face limitations in terms of involved computer resources and computer performance. In addition DNSBL-based solutions can be vulnerable to zero-day attacks. Heuristic-based solutions can identify some zero-day attacks, but heuristic-based solutions are limited because they are known to output a large number of false positives, i.e., they tend to incorrectly indicate that an email or website is part of a phishing cyber-attack when that email or web site is not.

Thus, a need exists for systems that can improve the accuracy and speed at which phishing cyber-attacks are detected to secure Internet users from these attacks. Differently stated, a need exists for systems to improve the detection of zero-day phishing cyber-attacks while overcoming the high false positive rate problem and other limitations known to be associated with some defense mechanisms against phishing cyber-attacks. Accordingly, a system is provided to identify phishing cyber-attacks based on a visual similarity approach implemented with at least one convolutional neural network.

The terms "computer", "processor", "computer processor", "compute device", or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), a graphics processing unit (GPU), or any other electronic computing device comprising one or more processors of any kind, or any combination thereof.

As used herein, the phrase "for example," "such as", "for instance", and variants thereof describe non-limiting embodiments of the presently disclosed subject matter. Reference in the specification to "one case", "some cases", "other cases", or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Attention is now drawn to FIG. 1, which shows a schematic illustrating an embodiment of a phishing cyber-attack detection system coupled to a computer network 105. The network architecture shown in FIG. 1 is an example that demonstrates some principles of the presently disclosed subject matter. Network 105 can include one or more types of computer networks. For example, computer networks can include any one of: the Internet, Local Area Network (LAN), Wide Area Network (WAN), Metropolitan Area Network (MAN), or mobile networks, or any combination thereof. Computers within the computer network can be implemented through any suitable connection (including wired or wireless) and communication technology or standard.

In the illustrated example, computer network 105 is coupled to a user compute device 113, phishing detector server 101, URL extractor server 103, phishing server 111, phishing email server 109, and trusted entity email server 107. The various compute devices in network 105 shown in FIG. 1 are operable to communicate over the network communication links. Solid lines connecting different computerized devices illustrated in FIG. 1 indicate a communication link.

A common phishing attack involves sending numerous spoofed emails pretending to be sent from a server associated with a trusted entity (e.g., a bank or a corporation) with which targeted individuals have a trusted relation. For example, in FIG. 1, user 115 can receive a spoofed email at compute device 113 sent via phishing email server 109. The spoofed email can be mascaraed to appear as a legitimate email sent by a trusted entity, that is from the perspective of user 115 the spoofed email can appear to be sent from trusted entity email server 107 when in reality was sent from phishing email server 109.

Spoofed emails can prompt or encourage individuals to click on a web link that is purportedly associated with the trusted entity; after clicking the web link, however, the individuals are redirected to a counterfeit or phishing website hosted at, for instance, phishing server 111. Thereafter, user 115 can be lured to enter personal data, user credentials such as username and passwords, confidential information, or other type of data that can be used by cyber-attackers to exploit the user and/or the trusted entity. Phishing attacks can also involve technical subterfuge techniques in which cyber-attackers send emails with self-executable malware configured to execute at a user compute device (e.g., 113) of the targeted individual and send information retrieved for the targeted user's compute device to a phishing server (e.g., 111). A variation of this technique is the implementation of a phishing web sites embedded with self-executable code configured to start when a targeted individual visits the phishing web site. For example, user 115 can receive a spoofed email at compute device 113 with a link that redirects user 115 to a phishing website hosted at phishing server 111 and unbeknownst to user 115 self-executable code is downloaded to compute device 113 from phishing server 111. The self-executable code can then, covertly send data stored at compute device 113 to phishing server 111.

It is noted that although the above examples of cyber-attacks involve combinations of spoofing emails, web links, and phishing websites configured to operate in conjunction as part of a single phishing cyber-attack, the embodiments described in the presently disclosed subject matter can be used to detect other types of phishing cyber-attacks. For instance, phishing cyber-attacks that operate only using one of a computer technique including spoofing email communications, web links directed to phishing websites, phishing websites and/or the implementation of self-executable code configured to retrieve information from targeted individuals and/or their computer systems to benefit cyber-attackers.

Referring to the presently disclosed subject matter, in some implementations, when phishing email server 109 sends a spoofing email to compute device 113, URL extractor server 103 can extract web links included in the spoofing email before user 115 clicks on them and send the extracted URLs to phishing detector server 101. It is noted that URL extractor 103 can operate on multiple data sources that send data to compute device 113 and/or data received at compute device 113. In some instances, URL extractor 103 can implement a network traffic monitor to inspect data packets incoming to compute device 113 and/or outgoing from compute device 113 and retrieve URLs when detected at the packet level. Likewise, URL extractor 103 can inspect emails sent to an email account associated with user 115 and extract URLs included in such an email at a Simple Mail Transfer Protocol (SMTP) mail server (not shown in FIG. 1) and thus, effectively extracting URLs included in emails before they reach compute device 113. In yet some other instances, URL extractor 103 can operate at the File Transfer Protocol (FTP) level (e.g., at an FTP server) and inspect files sent to compute device 113 and extract URLs included in such files before they reach compute device 113.

In some implementations, phishing detector server 101 receives a set of URLs from URL extractor 103 and executes one or more processes to determine if any of the URLs included in the set of URLs is associated with a phishing cyber-attack. In some instances, phishing detector server 101 produces a notification message and sends a notification signal to compute device 113 or other suitable compute device associated with user 115 when phishing detector server 101 determines that, for instance, a URL included in the set of extracted URLs is part of a phishing cyber-attack. In some instances, after determining that a URL is part of a cyber-attack, the phishing detector server 101 sends an instruction and/or message to compute device 113 to prevent user 115 from being redirected to, for example, a phishing website.

Figure 2:
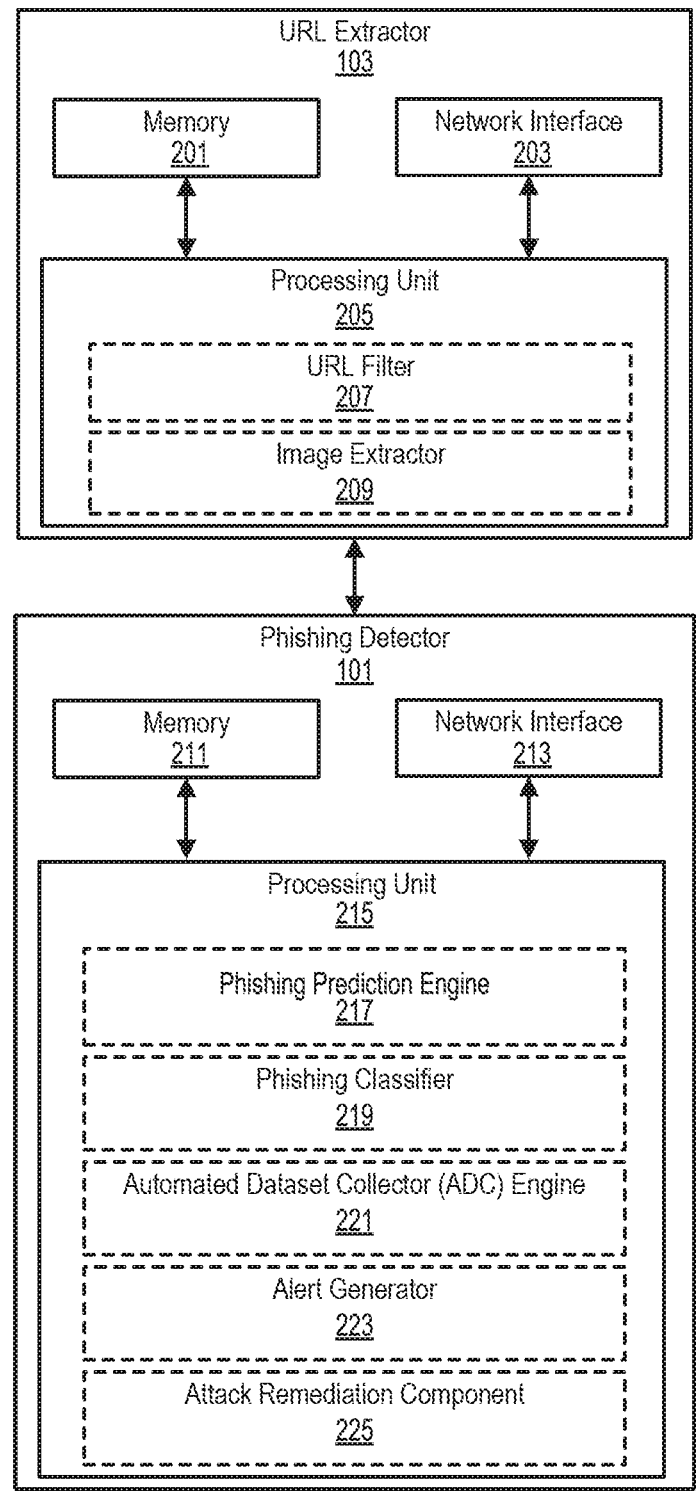
FIG. 2 is a block diagram illustrating a Uniform Resource Locator (URL) extractor server and a phishing detector server, according to an embodiment.

FIG. 2 shows a block diagram illustrating components of URL extractor server 103 and phishing detector server 101. Although URL extractor and phishing detector are shown in FIG. 2 implemented in two separate servers, in some embodiments URL extractor and phishing detector can be implemented in a single server or single compute device.

URL extractor server 103 includes at least one processing unit 205 including (or otherwise operatively connected to) one or more computer processors and computer memory 201 and network interface 203. Computer memory 201 can be implemented in, for example, a non-transitory computer readable medium configured with instructions to be executed by processing unit 205 to perform operations described below with reference to FIGS. 3 to 6. According to one example, processing unit 205 includes URL filter component 207 and image extractor component 209. The URL filter component 207 can include one or more URL filters configured to determine whether a URL is malicious and/or associated with a phishing cyber-attack. For instance, the URL filter component 207 can include one or more of a blacklist filter, whitelist filter, signature filter, and/or other suitable filter to determine if a URL is malicious. Thus, in some instances a determination of a phishing cyber-attack can be made by comparing an URL of a suspect webpage to URLs of webpages and/or web elements of trusted entities. In some instances, when the webpage's URL of the trusted entity is inconsistent with the URL of the suspicious page, the suspicious webpage is deemed to be associated with a phishing cyber-attack by the URL filter component 207.

The image extractor component 209 can produce an image of web elements associated with a URL. For instance, image extractor component 209 can render and/or retrieve web elements based on the URL and take an image or screenshot of the rendered and/or retrieved web elements. In some instances the image produced by the image extractor component 209 can include the entire content of a webpage, substantial portion of the content of a webpage, or a portion of a webpage. In some other instances, the image produced by the image extractor component 209 can include images of code included in, for example, script files, libraries or other suitable computer executable code that can be retrieved based on the URL. URL extractor server 103 can further include network interface 203 configured to communicate with phishing detector server 101 and various other compute devices connected to network 105.

Phishing detector server 101 includes at least one processing unit 215 including (or otherwise operatively connected to) one or more computer processors and computer memory 211 and network interface 213. Computer memory 211 can be implemented in, for example, a non-transitory computer readable medium configured with instructions to be executed by processing unit 215 to perform operations described below with reference to FIGS. 3 to 6. According to one example, processing unit 215 includes phishing prediction engine 217, phishing classifier 219, automated dataset collector (ADC) engine 221, alert generator component 223, and attack remediation component 225.

Phishing prediction engine 217 includes one or more deep convolutional neural networks used to determine whether web elements associated with a URL are legitimate and/or authorized by a trusted entity or whether such web elements are part of or associated with a phishing cyber-attack campaign. A further discussion with respect to convolutional neural networks that can be included in phishing prediction engine 217 is provided with reference to FIG. 4B.

Phishing classifier 219 includes logic to execute classification processes on one or more images of web elements based on outputs produced by phishing prediction engine 217. Processes executed by phishing prediction engine 217 and phishing classifier 219 are further discussed with respect to FIG. 4B and FIG. 6. Automated dataset collector (ADC) engine 221 includes logic to iteratively collect datasets from multiple data sources used to improve the accuracy and prediction power of phishing prediction engine 217 and phishing classifier 219. The processes executed by the ADC engine 221 are further discussed with reference to FIG. 5.

Alert generator 223 produces a notification signal indicative of a phishing cyber-attack when, for example, phishing classifier 219 indicates that there is a match or positive correlation between a URL and a phishing cyber-attack. In some instances, alert generator 223 can send the notification signal to, for example, the user compute device 113 (discussed with reference to FIG. 1), compute devices of a cybersecurity personnel, or other suitable systems.

Attack remediation component 225 blocks access to a web element classified to be part of a phishing cyber-attack. For example, when phishing classifier 219 indicates that there is a match or correlation between a URL and a phishing cyber-attack, attack remediation component 225 blocks the URL and thus, a user (e.g., user 115 in FIG. 1) is prevented from loading and or retrieving web elements associated with the URL.

Figure 3:
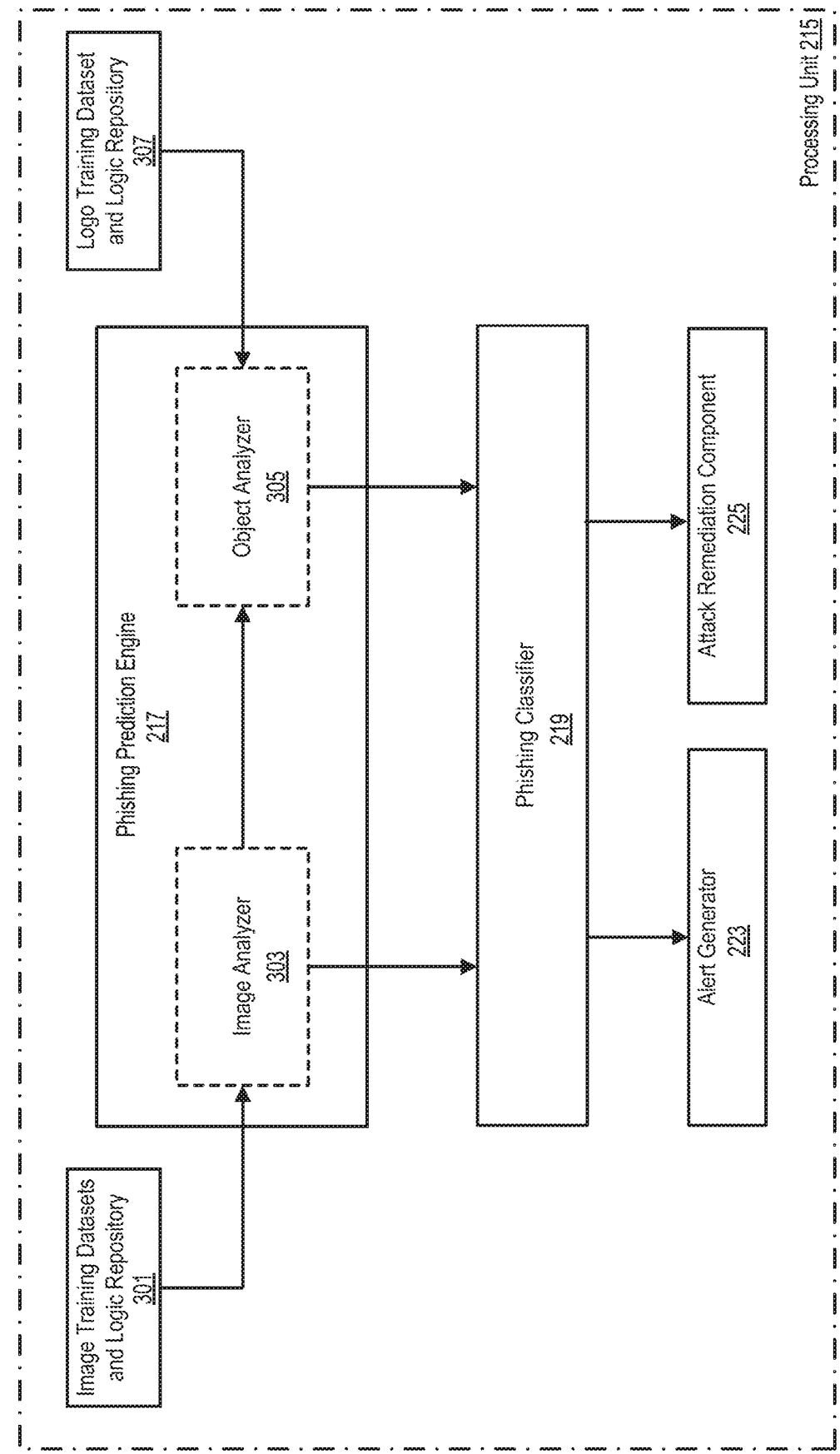
FIG. 3 is a block diagram illustrating components of a phishing prediction engine included in a phishing detector server, according to an embodiment.

Further components implemented at processing unit 215 are shown in FIG. 3. Specifically, it is shown that in some implementations, phishing prediction engine 217 includes an image analyzer 303 and an object analyzer 305. The image analyzer 303 and the object analyzer 305 can be implemented via one or more convolutional neural networks (not shown in FIG. 3) as the one further described with reference to FIG. 4B.

In some implementations, image analyzer 303 produces a similarity score, via a first convolutional neural network, to predict whether an image of a webpage is matches or positively correlates to a legitimate web element published and/or authorized for publication by a trusted entity or whether such a webpage is part of a phishing cyber-attack. Object analyzer 305 receives an image of a web element extracted from the webpage's image by image analyzer 303 and produces a similarity score, via a different convolutional neural network, to predict whether the extracted image (e.g., a logo, a logotype, logomark, or other graphical object) belongs to a trusted entity or is part of a phishing cyber-attack.

In some instances phishing classifier 219 can determine whether a URL is malicious or part of a phishing cyber-attack based on the output of image analyzer 303. In such a case, object analyzer 305 does not need to execute any further process and thus, phishing prediction engine 217 can effectively save computational resources. In other instances phishing classifier 219 determines whether a URL is malicious or part of a phishing cyber-attack based on the outputs produced by image analyzer 303 and object analyzer 305. For instance, image analyzer 303 can extract one or more web elements (e.g., logos or logotypes) from an image of a webpage and send such web elements to object analyzer 305, when a satisfactory prediction is not achieved by image analyzer 303 (e.g., image analyzer 303 outputs a similarity score resulting in an unknown classification). The object analyzer 305 can then, determines if a received logo, logotype and/or logomark is a web element that is part of a phishing cyber-attack or is a web element of a legitimate trusted entity.

As discussed above, alert generator 223 produces and sends a signal to one or more compute devices with a notification indicative of a phishing cyber-attack when the phishing classifier determines that there is a match or positive correlation between a URL and a phishing cyber-attack. Attack remediation component 225 blocks a URL when the phishing classifier 219 determines that there is a match or positive correlation between the URL and a phishing cyber-attack. In some implementations, attack remediation component 225 can add a URL to a static URL filter (e.g., a blacklist filter) discussed below with reference to FIG. 6.

Image training datasets and logic repository 301 includes datasets with images of webpages associated with trusted brands or trusted entities labeled as genuine, and/or associated with phishing cyber-attacks and logic to integrate new images to an image training dataset. Logo training dataset and logic repository 307 includes datasets with images of logos, logomarks, and/or logotypes associated with trusted brands or trusted entities labeled as genuine, and/or associated with phishing cyber-attacks and logic to integrate new images to a logo training dataset. In some implementations, the datasets included in repositories 301 and/or 307 are produced via an automated end-to-end collection process further described with reference to FIG. 5 and can be used as training sets in the training of CNN 400B (as shown at 415 in FIG. 4B).

In some implementations, each of the image analyzer 303 and the object analyzer 305 included in the phishing prediction engine 217 (shown in FIG. 2 and FIG. 3) includes at least one convolutional neural network (e.g., a first CNN for image analyzer 303 and a second CNN for object analyzer 305). Alternatively, in some other implementations, image analyzer 303 and object analyzer 305 can be implemented via a single convolutional neural network (e.g., a single CNN implemented for image analyzer 303 and object analyzer 305). Accordingly, processing unit 215 implements one or more convolutional neural networks configured to determine whether an image is associated with a phishing cyber-attack. An example of the training and implementation of a convolutional neural network (CNN) is discussed with reference to FIG. 4A and FIG. 4B.

Convolutional neural networks are a type of deep machine learning model that computes multiple convolutions over an input (e.g., a received image) to compute an output e.g., a similarity score between the received image and an image learned by the CNN. Convolutional neural networks include a sequence of processing layers, each processing layer transforms a volume of activation (e.g., a 3D data structure or tensor) to a different volume through a different computation. One or more linear and non-linear computations can be executed at each of these processing layers. The computations performed at each layer of a CNN are learned during a training phase. For instance, each of the convolutional blocks 401-409 shown in FIG. 4A can include one or more convolutional layers, one or more pooling layers, one or more Rectified Linear Unit (ReLU) layers, and other suitable processing layers.

In some implementations, a convolution layer performs a linear convolution over an image or feature map via a linear filter that can be described by:

$$f: \mathbb{R}^{M \times N \times K} \rightarrow \mathbb{R}^{M' \times N' \times K'}$$

where $\mathbb{R}$ is an array of real numbers of M×N pixels and K channels. The filter f extracts features from an input image or a feature map and the resulting array $\mathbb{R}^{M' \times N' \times K'}$ preserves, for example, spatial relationships between feature elements included in $\mathbb{R}^{M \times N \times K}$. Differently stated, a convolutional layer can be used to convolve an image with a set of features and produce a stack of filtered images or feature maps.

Pooling layers operate on individual features and reduce the dimensionality of a filtered image or feature map while retaining the most important data from an image i.e., data patterns that can be used to differentiate an image from other images. For instance, data that can be used to discern images that are part of a phishing cyber-attacks and images that are legitimately associated with a trusted entity, i.e., images that are not part of a phishing attack. Some known techniques to implement pooling layers include max-pooling, sum-pooling, and other suitable pooling techniques. Differently stated, pooling layers can be used to shrink an original stack of filtered images while maintaining a pattern found in the original stack in a shrunk (or reduced) version.

ReLU layers are a type of non-linear processing layer in which non-linearity is computed by the application of a filter that can be described as $$y_{ijk} = \max\{0, x_{ijk}\}$$

where the filter $y_{ijk}$ is applied to each pixel in a feature map producing a value of zero when $x_{ijk} < 0$ and a linear function with slope 1 when $x > 0$ effectively replacing all pixels with negative values in the feature map with zeroes. At each convolutional block, one or more processing layers can be arranged in different layer patterns; for instance, convolutional block 401 can include two convolutional layers followed by a ReLU layer, and/or a pooling layer, or other suitable layer pattern.

In some implementations, as shown at pre-trained CNN 400A (FIG. 4A) a feature map output produced at convolutional block 409 is sent to the fully connected layer 411. At the fully connected classifier layer 411, the feature map is converted into a vector. Each value in the vector is used as a weight to compute similarity scores further used to determine whether a web element (e.g., a webpage, logo, logotype, or logomark) is part of a phishing cyber-attack. In some instances, feature maps produced at convolutional blocks 401-409 and weights produced at the fully connected layer 411 are computed via back propagation and gradient descent techniques.

In some implementations, the pre-trained CNN 400A generates a score for a received image based on features learned during training phase. The pre-trained CNN 400A computes a score with respect to multiple labelled or known images, which can include webpages, logos, logotypes, logomarks and/or other images to determine a level of association or similarity score between a received image and an image learned by CNN 400A. It is appreciated that the pre-trained CNN 400A can be trained to calculate similarity scores between an input image and an image learned during training phase; the training set used to train pre-trained CNN 400A, however, does not need to include images of web elements associated with phishing cyber-attacks. Differently stated, the pre-trained CNN 400A can be used to determine whether an image is similar to another image when their similarity score exceeds a threshold but does not need to be configured to produce similarity scores between input images and images associated with phishing cyber-attacks.

In some implementations, the pre-trained CNN 400A can be used to train CNN 400B (e.g., second CNN shown in FIG. 4B) using the pre-trained CNN 400A in the application of a transfer of learning technique, i.e., by transferring weights learned by pre-trained CNN 400A to a new or second CNN. For instance, processing unit 215 (shown in FIG. 2) can remove the fully connected processing layer 411 from the pre-trained CNN 400A. Accordingly, the convolutional blocks 401, 403, 405, 407, and 409 are kept and reused in the training of CNN 400B to extract and learn a set of features from a training dataset 415 that includes, for example, a set of images or image clusters with images of web elements associated with a phishing cyber-attack. Such images or image clusters can include, for instance, webpages, logos, logotypes, logomarks, or other suitable images of web elements associated with one or more phishing cyber-attacks.

The fully connected processing layer 417 outputs a similarity score for each image received from the training set 415. The scores are then processed by phishing classifier 219, which produces a classification value (e.g., malicious, or unknown) based on whether the similarity score computed for an image has reached a predetermined threshold that is associated with a known or learned phishing cyber-attack. In some instances, when the similarity score reaches the predetermined threshold of a known or learned phishing cyber-attack then, the phishing classifier 219 classifies the image as malicious. In some other instances, when the similarity score does not reach a predetermined threshold of a known or learned phishing cyberattack then, the phishing classifier 219 classifies the image as unknown. It is appreciated that an alternative and/or additional implementation can produce similarity scores with respect to images of web elements learned to be legitimate images, that is, learned by CNN 400B to be part of a web campaign of a trusted entity.

An iterative training process regulated by conditional statement 419 is executed until a predetermined accuracy level is achieved. The accuracy level used at 419 can be produced via a testing and/or cross-validation process. In some instances, when a desired accuracy level is not achieved, further images and/or image clusters with different images than the images already entered into the CNN 400B are input or added at 421 to the training set 415. The images and/or image clusters included in training dataset used at 415 and/or 421 to train CNN 400B can be collected by the ADC component 221 (shown in FIG. 2), which is further discussed in FIG. 5 specifically at 501, 503, 505, and 507.

It is appreciated that in some implementations, the CNN 400B can be trained to output a set of similarity scores per image; each similarity score from the set of similarity scores can be produced for a different type of phishing cyber-attack. Thus, in some instances, the phishing classifier 219 classifies an image with respect to more than one phishing cyber-attack. The predetermined thresholds can vary for each phishing cyber-attack depending on, for example, a minimum set of features learned or known to discern an image that is part of a phishing cyber-attack (i.e., as malicious).

In some implementations a first CNN (as the one shown in FIG. 4B) can be trained to classify images of webpages and can be included in image analyzer 303 and a second CNN (also as the one shown in FIG. 4B) can be trained to classify logo, logotypes and/or logomarks and can be included in object analyzer 305. As discussed above, a notification signal indicative of a phishing cyber-attack can be produced by alert generator 223 (shown in FIG. 2 and FIG. 3) when phishing classifier 219 determines based on the output of the first CNN and/or the second CNN that the received image is part of a phishing cyber-attack.

Figure 4A:
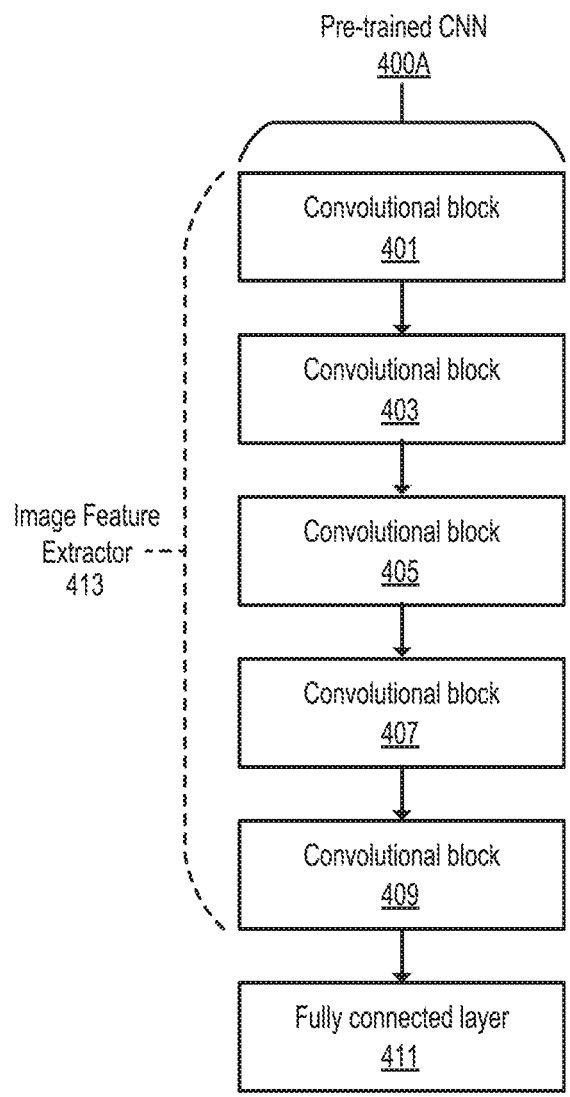
FIG. 4A-4B are flowcharts illustrating a pre-trained convolutional neural network and an automated training of a convolutional neural network (CNN) optimized to identify web elements of a phishing cyber-attack, according to an embodiment.
Figure 4B:
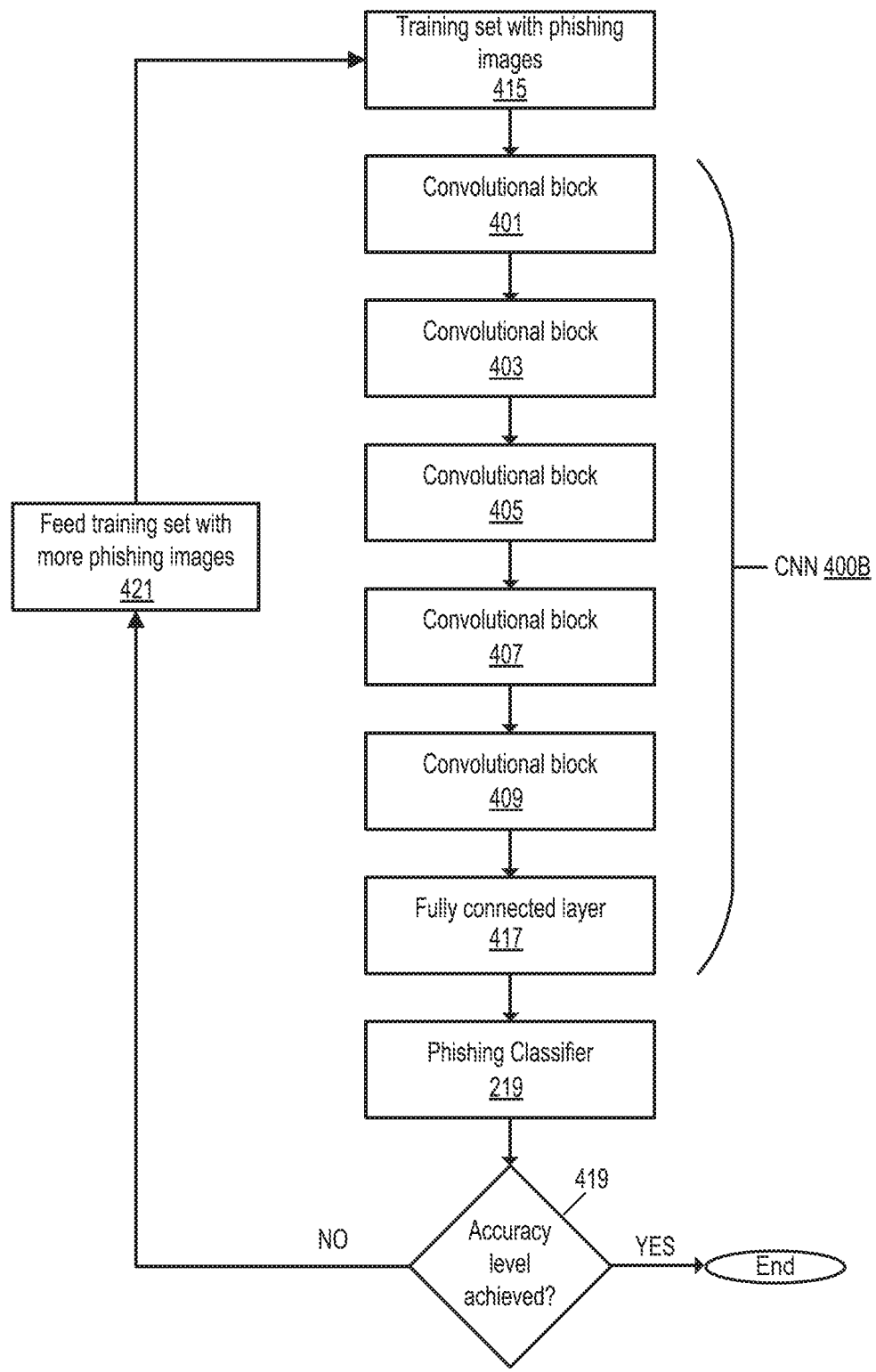

It is also appreciated that unlike other known machine learning systems to detect phishing cyber-attacks, the embodiment described in FIG. 4B does not rely on Scale Invariant Feature Transform (SIFT) techniques for the extraction of features and/or production of feature maps. Instead, the CNN 400B shown in FIG. 4B learns features and results in better prediction accuracy than, for example, known computer-vision approaches including SIFT techniques and machine learning techniques such as support vector machines. Specifically, the implementations disclosed herein can substantially reduce false positive classifications, and substantially increase classification accuracy between web elements that are part of a phishing cyber-attack and web elements that are not.

It is similarly appreciated that, the number of samples used to train the CNN 400B shown in FIG. 4B can be substantially reduced by the application of a transfer of learning technique. The application of such a transfer of learning technique can also eliminate the need to use graphical processing units (GPUs) while reducing the training time used to achieve desired accuracy levels. Such improvements are enabled at least in part by transferring weights learned by the pre-trained convolutional neural network 400A to convolutional neural network 400B. Specifically, this can be accomplished by removing the last fully connected layer 411 from the pre-trained convolutional neural network 400A to produce a feature extractor (e.g., image feature extractor 413). Thereafter, a training set with, for example, images of web elements of a phishing cyber-attack can be fed into the feature extractor to extract a set of features from such images. The set of features can then be used to train a new convolutional neural network (e.g., CNN 400B) different from the pre-trained convolutional neural network (e.g., CNN 400A). Specifically, the set of extracted features can be used to train a fully connected layer (e.g., 417 in FIG. 4B) of the new convolutional neural network to predict when images of web elements are associated with the phishing cyber-attack.

Figure 5:
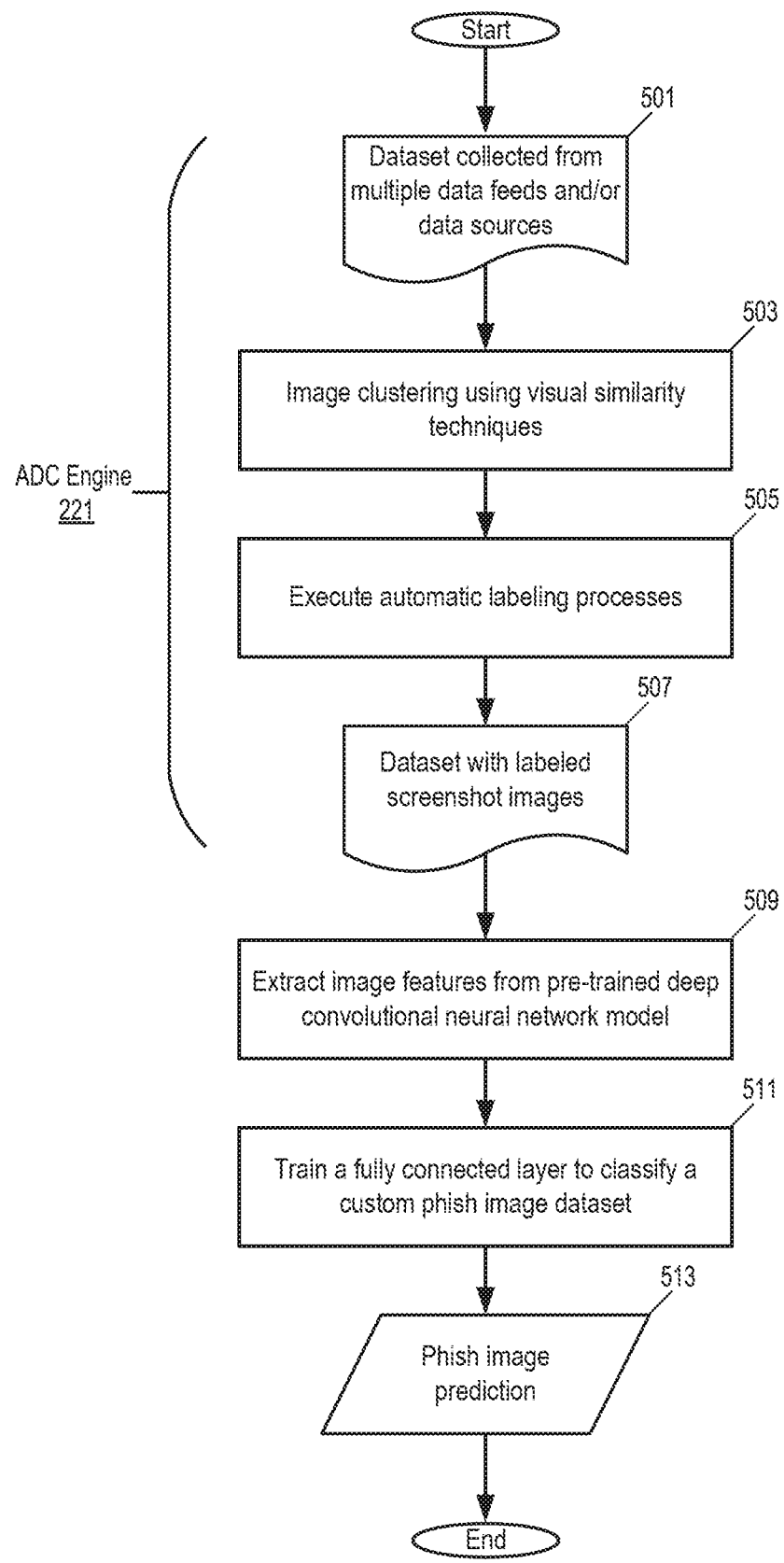
FIG. 5 is block chart illustrating an example of a deep convolutional neural network for the detection of phishing cyber-attacks, according to an embodiment.

A process executed by ADC engine 221 is now discussed with reference to FIG. 5 specifically with reference to 501, 503, 505, and 507. In some implementations, ADC engine 221 recurrently or iteratively collects at 501 web elements from different data sources. Examples of such web elements can include URLs, IP addresses, screenshots or images of phishing websites, screenshots or images of trusted third-party websites, phishing emails, logos, logomarks, and/or logotypes. The web elements can be retrieved at the packet level (e.g., via a sniffer), from the Internet, the World Wide Web (e.g., via a crawler) or other suitable computer network, from email traffic (e.g., via SMTP protocol monitor), from publicly available blacklist databases (e.g., IP-based addresses blacklist databases, domain-based blacklist databases) and from other suitable sources. Accordingly, the automated collection of datasets from multiple and diverse sources enables phishing detector 101 to improve the detection of zero-days attacks because the CNN 400B described with reference to FIG. 4B can be recurrently or iteratively retrained with different or subsequent training datasets having new web elements not included in training datasets used in previous training phases.

In some implementations, the ADC engine 221 can produce subsequent datasets at periodic intervals of time and for each periodic interval of time new features can be extracted from such subsequent datasets. Thus, one or more CNNs such as 400B and/or pre-trained CNN 400A can be re-trained at each periodic interval of time and learn to identify webpages, URLS, logos, logotypes, logomarks or other suitable type of web elements that are associated with different cyber-attacks. Likewise, one or more CNNs such as 400B and/or pre-trained CNN 400A can be re-trained at each periodic interval of time and learn to identify webpages, URLS, logos, logotypes, logomarks or other suitable type of web elements that are associated with different trusted-entities. Differently stated, because the CNN can learn iteratively from new samples collected by ADC engine 221 the CNN can preemptively detect new web elements associated with existent or new cyber-attacks before such cyber-attacks reach their first victim system or user.

In some implementations, web elements collected as images can be clustered at 503 using, for instance, one or more visual similarity technique. Visual similarity techniques are a type of content based image analysis that involves computing similarity measures between images based on features of such images. Examples of image features often used in visual similarity techniques include form of edges included in an image, colors, types of textures determined based on pixel values, shape measures, salient point or regions and other suitable features. Some examples of distances or similarity measures that can be computed at 503 to compare the similarity of images include grayscale image distance, spectrum image distance, color histogram distance, texture histogram distance, and other suitable distances. Thereafter, a clustering process can be executed to group images based on the computed distances into clusters or groups. The clustering process ends up grouping together images that have the most similarities in common. Some examples of clustering techniques that can be use at 503, include a k-means clustering technique, Linde-Buzo-Gray technique, or other centroid-based clustering algorithm.

Thereafter, or in parallel, each retrieved image can be labeled using, for example, an optical character recognition (OCR) process at 505. The OCR process executed at 505 produces one or more labels based on the content of each retrieved image. The OCR process can include operations to identify text included in an image, perform character segmentation (i.e., decompose an image including text into a set of images, each image including one character), perform feature extractions from the images, convert based on the extracted features each image into a character code (e.g., American Standard Code for Information Interchange), and produce a label based on the character codes. In some instances, OCR is performed at 505 only on the centroid of each cluster from a set of clusters of images and label all the images in that cluster with a label extracted from the centroid. In some other implementations, one or more of the image analyzer 303 and/or the object analyzer 305 can be trained and used to performed the automatic labeling process shown at 505.

The labeled images at 507 can include images of web elements of phishing cyberattacks and/or images from trusted third-parties. In some implementations, the features of the labeled images can be extracted at 509 through, for instance, the feature extractor 413 (discussed with reference to FIG. 4A), and the fully connected layer 417 (shown in FIG. 4B) can be trained or retrained at 511, such that the fully connected layer 417 outputs at 513 a similarity score to determine whether an unseen image is part of a phishing cyber-attack campaign or a trusted entity campaign.

Figure 6:
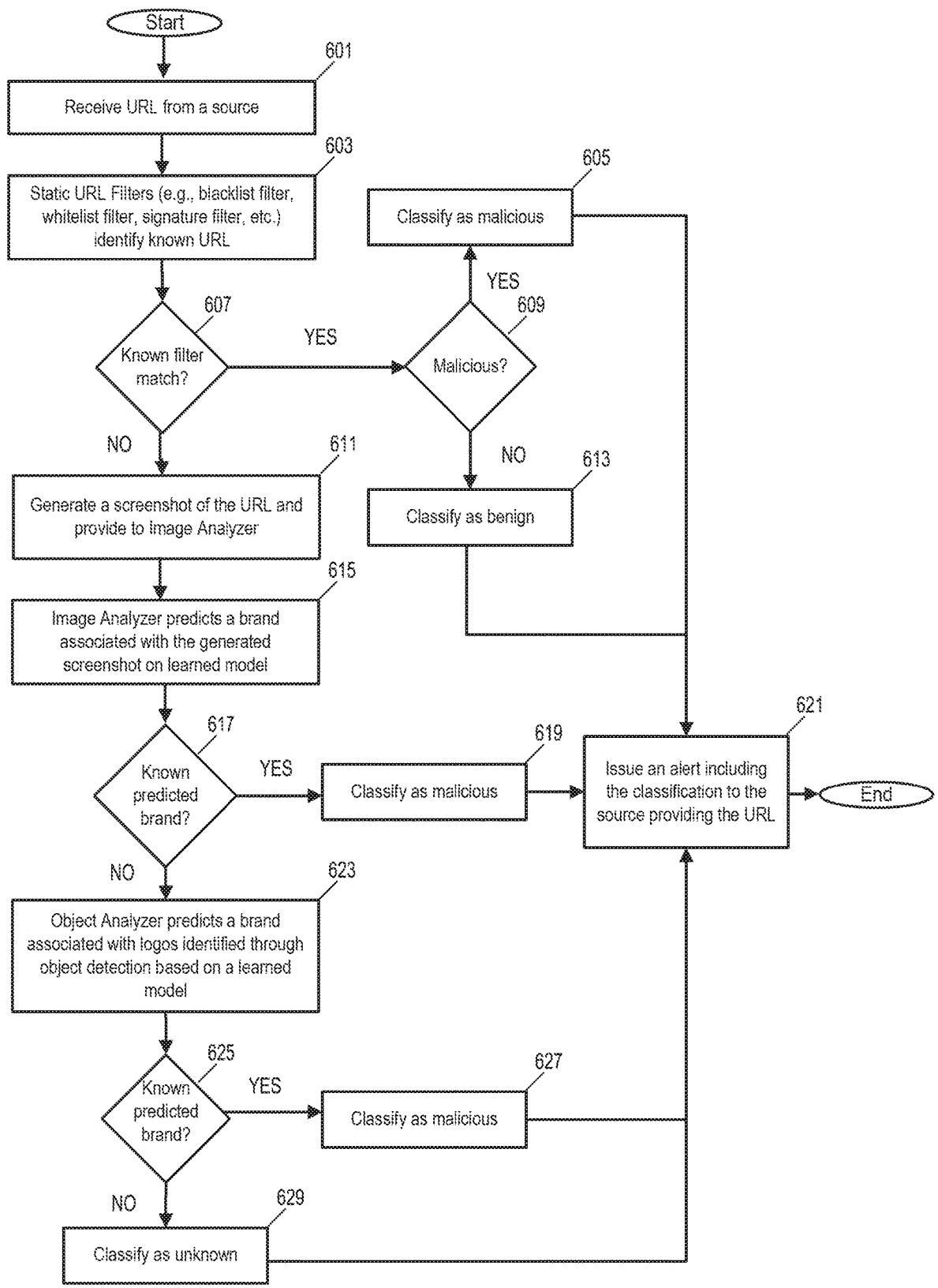
FIG. 6 is a flowchart illustrating a process to detect phishing cyber-attacks, according to an embodiment.

The process shown in FIG. 6 illustrates classification examples of operations that can be executed by URL extractor 103 and/or phishing detector 101. At 601, URL extractor 103 receives a URL from a source compute device, for instance, a URL included in an email. In some implementations, the URL extractor 103 can pass the received URL through a series of filters at 603 including blacklist filters, whitelist filters, signature filters, and/or other suitable filters. At conditional statement 607 the URL extractor 103 determines whether there was a positive match for the received URL based on the applied filters. In some instances, when a positive match occurs between the received URL and a URL filter then, the flow continues at conditional statement 609. At conditional statement 609, the URL extractor determines whether the received URL results in a positive match with a malicious entity; for example, if the URL is associated with a phishing cyber-attacker, in such a case the URL is classified as malicious at 605 and an alert is produced and sent to, for example, a user or users who received URL as shown at 621. Alternatively, when the URL extractor determines that the URL is not malicious (no positive match) the URL is classified as benign at 613, and an alert is produced and sent with the given classification at 621 as discussed above.

In some instances, when none of the filters applied by the URL extractor 103 match the received URL, the URL extractor 103 submits the received URL into, for example, a sandbox testing environment or browser at 611. Thereafter, the URL extractor 103 takes an image of a web element or webpage loaded based on the URL at the sandbox testing environment. The URL extractor 103 then sends the image to the phishing detector 101.

The phishing detector, at 611, sends the received image to image analyzer 303 discussed with reference to FIG. 3. The image analyzer 303 predicts at 615 whether the received image is associated with a brand or pattern known to be characteristic of a phishing cyber-attack, based on, for example, a CNN as described with respect to FIG. 4B. In some instances, when the image analyzer 303 determines that the image is associated with a known brand or pattern (e.g., a positive match with a web element known to be malicious) at 617, then the image (and the received URL) are classified as malicious at 619 and an alert is produced and sent to one or more users as discussed above with reference to 621. In some instances when the image analyzer 303 cannot determine at 617 if the image is known to be associated with a brand or pattern characteristic of a cyber-attack then, the image analyzer 303 sends the image or portions of the image (e.g., portions including an image of a logo, logotype, and/or logomark) to the object analyzer 305 for further inspection.

The object analyzer 305 predicts, at 623, a brand associated with logos or logotypes identified on the received screenshot based on an object detection process executed via a CNN as described with respect to FIG. 4B. In some instances, when the object analyzer 305 predicts that the identified logo or logotypes are associated with a brand or pattern known to be characteristic of a phishing cyber-attack (e.g., a positive match with a web element known to be malicious), at 625, the logo or logotypes, the screenshot, and the received URL are classified as malicious; otherwise, they are classified as unknown. As previously discussed, then the flow can continue from 627 or 629 to produce and send an alert to, for example, a user or users who received URL at 621.

It is appreciated that the process shown in FIG. 6 can advantageously determine whether a URL is associated with a phishing attack at 605, 613, 619, and 627. Accordingly, a calibrated amount of computation time and resources are consumed depending on whether a classification can be produced at 605, 613, 619, or 627. Differently stated, a classification determined at 627 can be more computationally expensive than a classification determined at 605, 613, or 619; computation time and resources, however, would only be invested at 627 when a robust classification is not achieved via the other alternatives.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, solid state storage devices, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. An apparatus, comprising:
 a processor; and
 a memory storing code which, when executed by the processor, causes the processor to:
  receive a signal indicative of a uniform resource locator;
  extract a first web element associated with the uniform resource locator based on an output of a uniform resource locator filter;

generate via at least one convolutional neural network a first set of features associated with the first web element;

determine a positive match between the uniform resource locator and a phishing cyber-attack when a similarity score between the first set of features and a third set of features learned by the at least one convolutional neural network reaches a first predetermined threshold;

when the similarity score between the first set of features and the third set of features does not reach the first predetermined threshold:
  generate via the at least one convolutional neural network a second set of features associated with a second web element extracted from the first web element; and
  determine the positive match between the uniform resource locator and the phishing cyber-attack when a similarity score between the second set of features and a fourth set of features learned by the at least one convolutional neural network reaches a second predetermined threshold; and produce a notification indicative of the phishing cyber-attack when the positive match between the uniform resource locator and the phishing cyber-attack is determined.

2. The apparatus of claim 1, wherein:
the signal is a first signal; and
the memory storing code which, when executed by the processor, further causes the processor to:
send a second signal with the notification indicative of the phishing cyber-attack to a compute device of a user.

3. The apparatus of claim 1, wherein the code to extract the first web element includes code to:
  load a webpage referenced by the uniform resource locator; and
  input an image of the webpage into the at least one convolutional neural network.

4. The apparatus of claim 1, wherein the code to extract the first web element includes code to:
  input the uniform resource locator to the uniform resource locator filter, the uniform resource locator filter includes at least one of a blacklist filter, a whitelist filter, or a signature filter; and
  extract the first web element when the uniform resource locator filter classifies the uniform resource locator as unknown.

5. The apparatus of claim 1, wherein the code to generate via the at least one convolutional neural network the second set of features includes code to:
  extract from the first web element an image of at least one of a logo, a logotype, or a logomark; and
  input the image of the at least one of a logo, a logotype, or a logomark into the at least one convolutional neural network.

6. The apparatus of claim 1, wherein the at least one convolutional neural network includes a first convolutional neural network trained to identify a phishing cyber-attack based on a webpage image and a second convolutional neural network trained to identify a phishing cyber-attack based on at least one image of a logo, a logotype and a logomark.

7. The apparatus of claim 1, wherein the signal indicative of the uniform resource locator is an email message.

8. A non-transitory computer-readable medium comprising code which, when executed by a processor, cause the processor to:

collect a dataset with images associated with a set of uniform resource locators;

produce a set of image clusters based on a content-based image retrieval process and the dataset, each image cluster from the set of image clusters including a subset of the images grouped together based on similarities of at least one feature included in the subset of the images;

train a first convolutional neural network with a training set that includes at least one image cluster associated with a phishing cyber-attack and at least one image cluster associated with trusted sources, the at least one image cluster associated with the phishing cyber-attack and the at least one image cluster associated with the trusted sources selected from the set of image clusters;

extract, via the first convolutional neural network, a set of features associated with the phishing cyber-attack; and train a second convolutional neural network based on the set of features associated with the phishing cyber-attack such that the second convolutional neural network is configured to predict when an image associated with a uniform resource locator not included in the training set is associated with the phishing cyber-attack.

9. The non-transitory computer-readable medium of claim 8 wherein the code includes code to further cause the processor to:
execute an optical character recognition process to label each image cluster from the set of image clusters.

10. The non-transitory computer-readable medium of claim 8 wherein the uniform resource locator is a first uniform resource locator and the code includes code to further cause the processor to:
  receive a signal indicative of a second uniform resource locator not included in the training set;
  produce at least one image associated with the second uniform resource locator; and
  send a signal with a notification indicative of the phishing cyber-attack to a compute device of a user when the second convolutional neural network predicts that the at least one image associated with the second uniform resource locator is associated with the phishing cyber-attack.

11. The non-transitory computer-readable medium of claim 8 wherein the image associated with the uniform resource locator is an image of a webpage referenced by the uniform resource locator.

12. The non-transitory computer-readable medium of claim 8 wherein the image associated with the uniform resource locator is an image of a logo, a logotype, or a logomark.

13. The non-transitory computer-readable medium of claim 8 wherein each uniform resource locator from the set of uniform resource locators is associated with the phishing cyber-attack.

14. A non-transitory computer-readable medium comprising code which, when executed by a processor, cause the processor to:
  train a first convolutional neural network with a first dataset including a set of images that are not associated with a phishing cyber-attack;
  remove a processing layer from the first convolutional neural network when the first convolutional neural network reaches a predetermined accuracy level;
  extract, via the first convolutional neural network, a set of features from a second dataset including a set of image clusters associated with the phishing cyber-attack;

train, based on the extracted set of features, a second convolutional neural network to predict whether a received image is associated with the phishing cyber-attack; and produce a notification signal indicative of the phishing cyber-attack when the second convolutional neural network predicts that the received image is associated with the phishing cyber-attack.

15. The non-transitory computer-readable medium of claim 14 wherein the phishing cyber-attack is a first phishing cyber-attack, the received image is a first received image, the notification signal is a first notification signal, and the code includes code to further cause the processor to:

produce a subsequent dataset via a content-based image retrieval process executed at periodic intervals of time and for each periodic interval of time:

extract, via the first convolutional neural network, a subsequent set of features from the subsequent dataset, the subsequent dataset includes a set of image clusters associated with a second phishing cyber-attack;

re-train, based on the subsequent set of features, the second convolutional neural network to predict whether a second received image is associated with the second phishing cyber-attack; and produce a second notification signal indicative of the second phishing cyber-attack when the second convolutional neural network predicts that the second received image is associated with the second phishing cyber-attack.

16. The non-transitory computer-readable medium of claim 14 wherein the processing layer is a fully connected processing layer of the first convolutional neural network.

17. The non-transitory computer-readable medium of claim 14 wherein the received image is a website image.

18. The non-transitory computer-readable medium of claim 14 wherein the received image is an image of a logo, a logotype, or a logomark.

19. The non-transitory computer-readable medium of claim 14 wherein the received image is extracted from an email content.

20. The non-transitory computer-readable medium of claim 14 wherein the received image is extracted based on a uniform resource locator included in an email content.

21. A method, comprising:

receiving an input with a uniform resource locator;

producing an image of a webpage based on the uniform resource locator;

determining a first correlation between the uniform resource locator and a phishing cyber-attack based on the image of the webpage and an output of a first convolutional neural network;

determining a second correlation between the uniform resource locator and the phishing cyber-attack based on (1) an image of at least one of a logo, a logotype, or a logomark, and (2) the output of a second convolutional neural network when the first correlation does not indicate a positive correlation between the uniform resource locator and the phishing cyber-attack, the at least one of the logo, the logotype, or the logomark extracted from the image of the webpage; and producing a notification indicative of the phishing cyber-attack when at least one of the first correlation and the second correlation indicates a positive correlation between the uniform resource locator and the phishing cyber-attack.

22. The apparatus of claim 1, wherein:

the at least one convolutional neural network includes a first convolutional neural network trained to identify a phishing cyber-attack based on a webpage image, the webpage image generated based on the uniform resource locator; and the at least one convolutional neural network includes a second convolutional neural network trained to identify a phishing cyber-attack based on at least one image of a logo, a logotype or a logomark, the at least one image of a logo, a logotype or a logomark extracted based on the webpage image.

23. The apparatus of claim 1, wherein:

the first set of features is associated with a webpage image; and the second set of features is associated with at least one of a logo, a logotype or a logomark.

24. A method, comprising:

receiving a dataset with images associated with a set of uniform resource locators;

generating a set of image clusters based on a content-based image retrieval process and the dataset, each image cluster from the set of image clusters including a subset of the images grouped together based on similarities of at least one feature included in the subset of the images;

train a first convolutional neural network with a training set that includes at least one image cluster associated with a phishing cyber-attack and at least one image cluster associated with trusted sources, the at least one image cluster associated with the phishing cyber-attack and the at least one image cluster associated with the trusted sources selected from the set of image clusters;

extract, via the first convolutional neural network, a set of features associated with the phishing cyber-attack; and train a second convolutional neural network based on the set of features associated with the phishing cyber-attack such that the second convolutional neural network is configured to predict when an image associated with a uniform resource locator not included in the training set is associated with the phishing cyber-attack.

* * * * *